US012228256B2

(12) United States Patent
Li et al.

(10) Patent No.: US 12,228,256 B2
(45) Date of Patent: Feb. 18, 2025

(54) BUBBLE LAMP FOR DECORATION

(71) Applicant: Sichuan Jamie Charming Technology Co., Ltd., Nanchong (CN)

(72) Inventors: Min Li, Nanchong (CN); Xin Zhang, Nanchong (CN); Yanhong Gui, Nanchong (CN)

(73) Assignee: Sichuan Jamie Charming Technology Co., Ltd., Nanchong (CN)

( * ) Notice: Subject to any disclaimer, the term of this patent is extended or adjusted under 35 U.S.C. 154(b) by 0 days.

(21) Appl. No.: 18/581,479

(22) Filed: Feb. 20, 2024

(65) Prior Publication Data

US 2024/0191851 A1 Jun. 13, 2024

(51) Int. Cl.

| | |
|---|---|
| ***F21S 10/00*** | (2006.01) |
| ***F21V 17/14*** | (2006.01) |
| ***F21V 29/90*** | (2015.01) |
| ***F21W 121/00*** | (2006.01) |
| ***F21Y 115/10*** | (2016.01) |

(52) U.S. Cl.

CPC ............ *F21S 10/002* (2013.01); *F21V 17/14* (2013.01); *F21V 29/90* (2015.01); *F21W 2121/00* (2013.01); *F21Y 2115/10* (2016.08)

(58) Field of Classification Search

CPC ......... F21S 10/002; F21V 29/90; F21V 17/14

See application file for complete search history.

(56) References Cited

U.S. PATENT DOCUMENTS

| | | | | | |
|---|---|---|---|---|---|
| 2,412,171 | A * | 12/1946 | Petry | A47G 33/0809 | 40/406 |
| 2,453,176 | A * | 11/1948 | Abramson | F21S 4/10 | 40/406 |
| 2,453,177 | A * | 11/1948 | Abramson | F21S 4/10 | 40/406 |
| 2,569,078 | A * | 9/1951 | Silver | F21S 10/002 | 40/406 |
| 4,011,444 | A * | 3/1977 | Levy | F21S 6/001 | 362/362 |
| 4,072,855 | A * | 2/1978 | Marchese | F21S 10/002 | 362/101 |
| 6,375,337 | B1 * | 4/2002 | Hwang | F21S 10/002 | 362/439 |
| 2002/0027775 | A1 * | 3/2002 | Gibboney, Jr. | F21V 17/04 | 362/35 |
| 2003/0112621 | A1 * | 6/2003 | Lee | F21S 10/002 | 362/101 |

(Continued)

*Primary Examiner* — Bryon T Gyllstrom

(74) *Attorney, Agent, or Firm* — Hemisphere Law, PLLC; Zhigang Ma

(57) ABSTRACT

The present disclosure relates to the technical field of lamps, and discloses a bubble lamp for decoration. The bubble lamp includes a bubble tube and a heating bulb which are used cooperatively; the bubble tube is a glass tube and is sealed; low-boiling-point liquid is further injected into the bubble tube; the heating bulb includes a lamp holder, a bulb shell, and a heating light source; the bulb shell is fixedly connected to the lamp holder; the heating light source is electrically connected to the lamp holder; the heating light source is electrified to generate heat and promotes the low-boiling-point liquid inside the bubble tube to be boiled and generate bubbles; the bubble lamp for decoration further includes a catalyst layer configured to assist the low-boiling-point liquid in generating the bubbles.

9 Claims, 5 Drawing Sheets

(56) References Cited

U.S. PATENT DOCUMENTS

| | | | | |
|---|---|---|---|---|
| 2004/0233680 | A1* | 11/2004 | Lee | F21S 10/002 362/562 |
| 2011/0122613 | A1 | 5/2011 | Hsu | |
| 2014/0185303 | A1 | 7/2014 | Shao | |
| 2017/0356607 | A1* | 12/2017 | Lin | F21S 10/002 |

* cited by examiner

BUBBLE LAMP FOR DECORATION

TECHNICAL FIELD

The present disclosure relates to the technical field of lamps, and in particular, to a bubble lamp for decoration.

BACKGROUND

Bulbs are common lighting equipment. With the continuous development of society and science and technology, Christmas bulbs, neon bulbs, and automotive bulbs that are commonly used in people's lives have gradually emerged, making the life more beautiful and brilliant. However, as traditional bulbs use a strip lamp body and a circular shell, the traditional bulbs are generally not vivid and unchangeable in terms of decoration. Therefore, the bulbs are monotonous and uninteresting during use. In view of this, the inventor has made a new invention.

SUMMARY

The present disclosure aims to provide a bubble lamp for decoration for the shortcomings in the prior art. The bubble lamp has the characteristics of vividness and interestingness.

In order to achieve the above objective, the present disclosure discloses a bubble lamp for decoration, including a bubble tube and a heating bulb which are used cooperatively, wherein the bubble tube is a glass tube and is sealed; low-boiling-point liquid is further injected into the bubble tube; the heating bulb comprises a lamp holder, a bulb shell, and a heating light source; the bulb shell is fixedly connected to the lamp holder; the heating light source is electrically connected to the lamp holder; the heating light source is electrified to generate heat and promotes the low-boiling-point liquid inside the bubble tube to be boiled and generate bubbles; the bubble lamp for decoration further includes a catalyst layer configured to assist the low-boiling-point liquid in generating the bubbles; and the catalyst layer is fixedly arranged at one end of an inner side of the bubble tube facing the heating light source.

Preferably, the low-boiling-point liquid is dichloromethane.

Preferably, the catalyst layer is a mixture of sodium silicate and glass splinters.

Preferably, the bubble lamp for decoration further includes an outer decorative lampshade; a bottom end of the outer decorative lampshade is provided with a bayonet; a top end of the outer decorative lampshade is provided with a first insertion hole configured to assemble the bubble tube; the heating bulb is assembled inside the outer decorative lampshade; and the lamp holder extends out of the bayonet.

Preferably, a circumferential side of the first insertion hole extends towards an outer end to form several elastic parts; the several elastic parts are spaced apart from one another and distributed in a surrounding manner to form an annular limiting part; and the elastic parts are all provided with ribs.

Preferably, the bayonet is provided with a notch.

Preferably, the outer decorative lampshade includes a housing and an end cover connected to the housing; the end cover is provided with at least one group of connecting protruding points; and the housing is provided with connecting recesses corresponding to the connecting protruding points.

Preferably, the heating light source is a tungsten filament, and the bulb shell is a glass bulb shell.

Preferably, a bottom end of the first insertion hole extends downwards and is provided with an isolation frame for at least placing the bubble tube.

Preferably, the heating light source includes a power board and a light-emitting diode (LED) mounted on an upper surface of the power board; the bulb shell is a plastic bulb shell; a second insertion hole is arranged at a top end of the bulb shell; and the bubble tube is inserted into the second insertion hole and resists against the LED.

Beneficial effects: Compared with the prior art, the present disclosure discloses a bubble lamp for decoration. The bubble lamp includes a bubble tube and a heating bulb which are used cooperatively, and further includes a catalyst layer configured to assist the low-boiling-point liquid in generating bubbles; and the catalyst layer is fixedly arranged at one end of an inner side of the bubble tube facing the heating light source. In the present disclosure, the bubble tube filled with the low-boiling-point liquid is used in conjunction with the bulb; light of the bulb directly irradiates the bubble tube; under the action of the liquid, a more beautiful lighting effect is achieved; and meanwhile, extract heat generated by light emission of the bulb can also be recycled and converted into ceaseless bubbles inside the bubble tube, so that the lamp is vivid and full of interest.

REFERENCE NUMERALS INCLUDE

Figure 1:
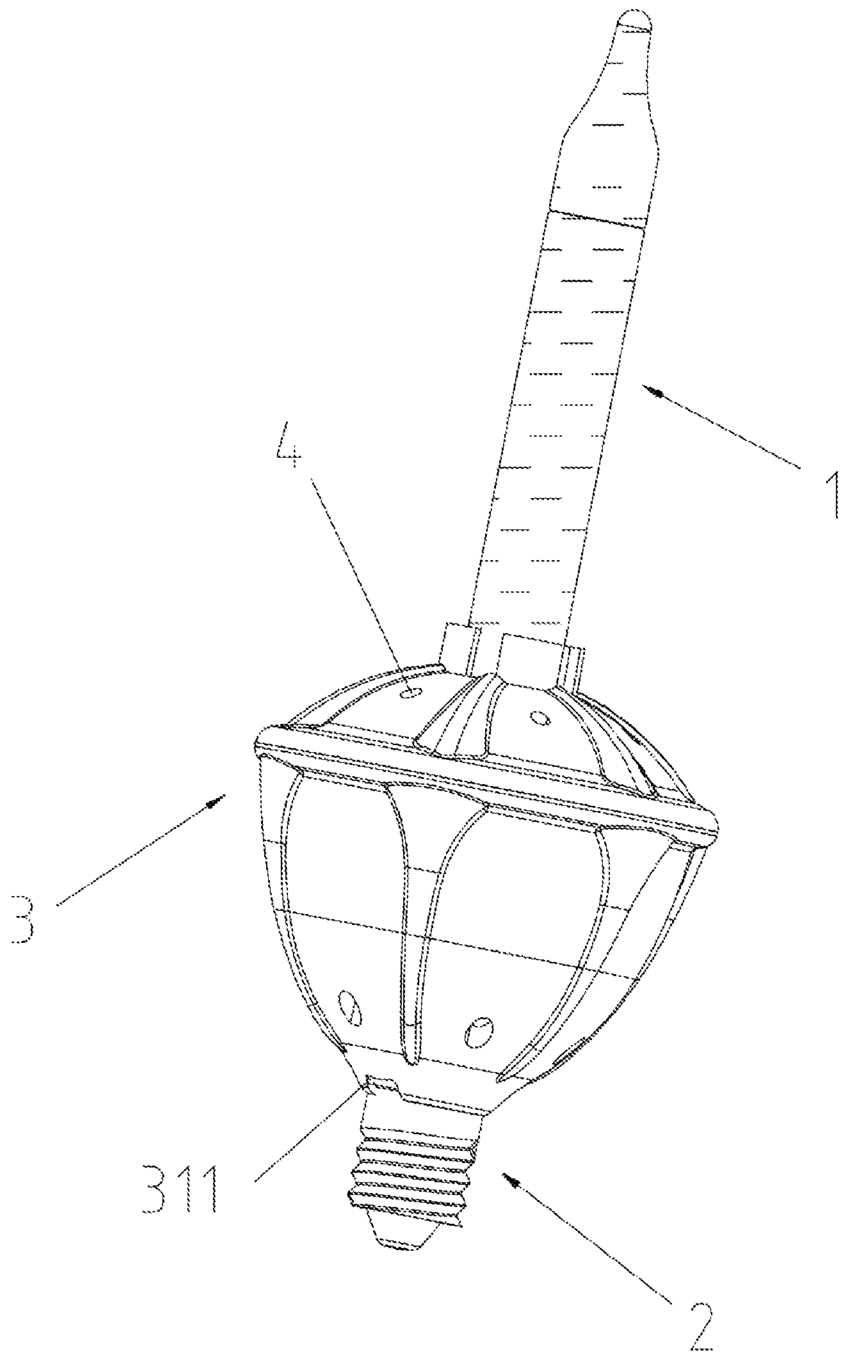
FIG. 1 is a three-dimensional diagram of the present disclosure.
Figure 2:
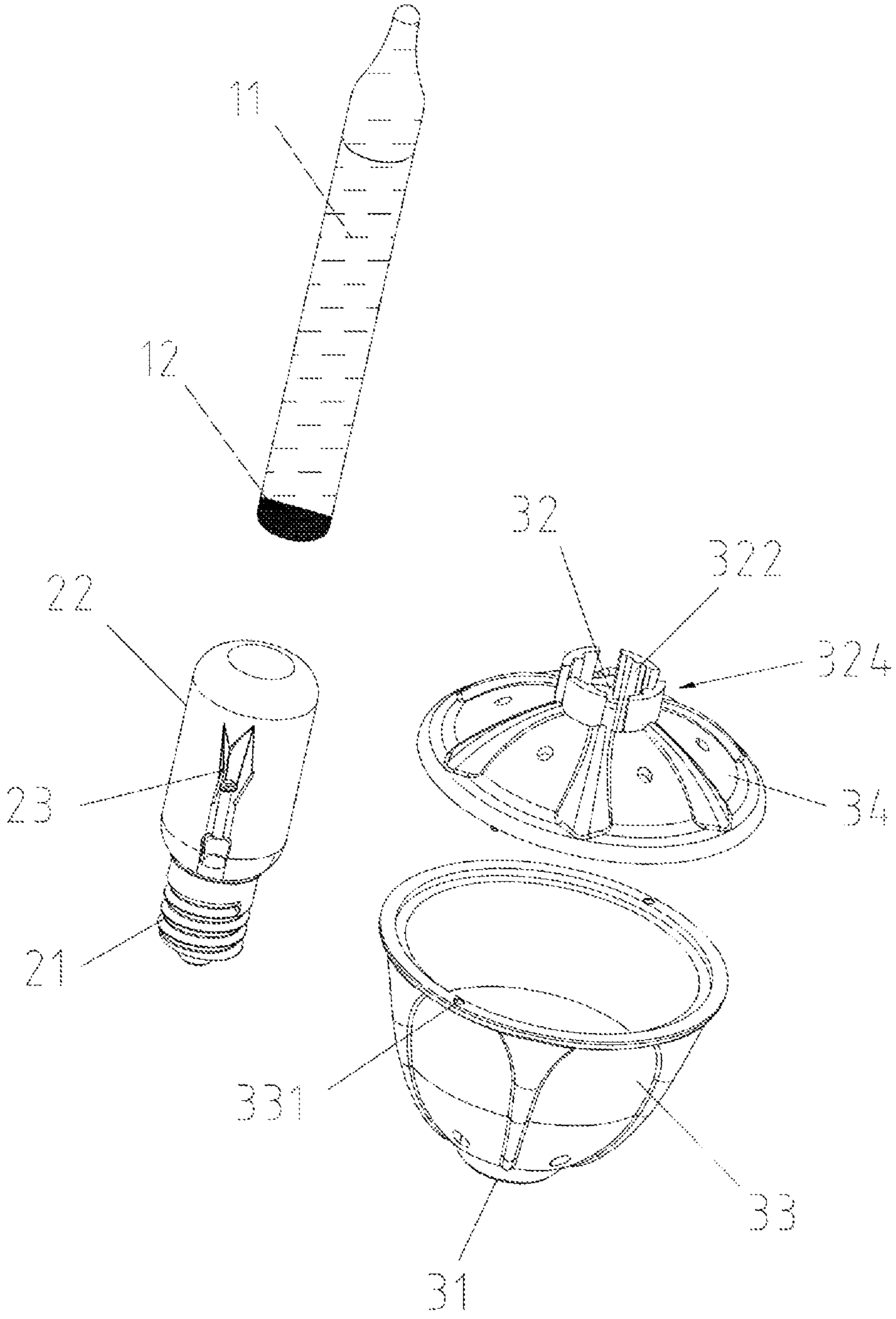
FIG. 2 is a schematic diagram of an exploded structure of an embodiment of a tungsten filament lamp according to the present disclosure.
Figure 3:
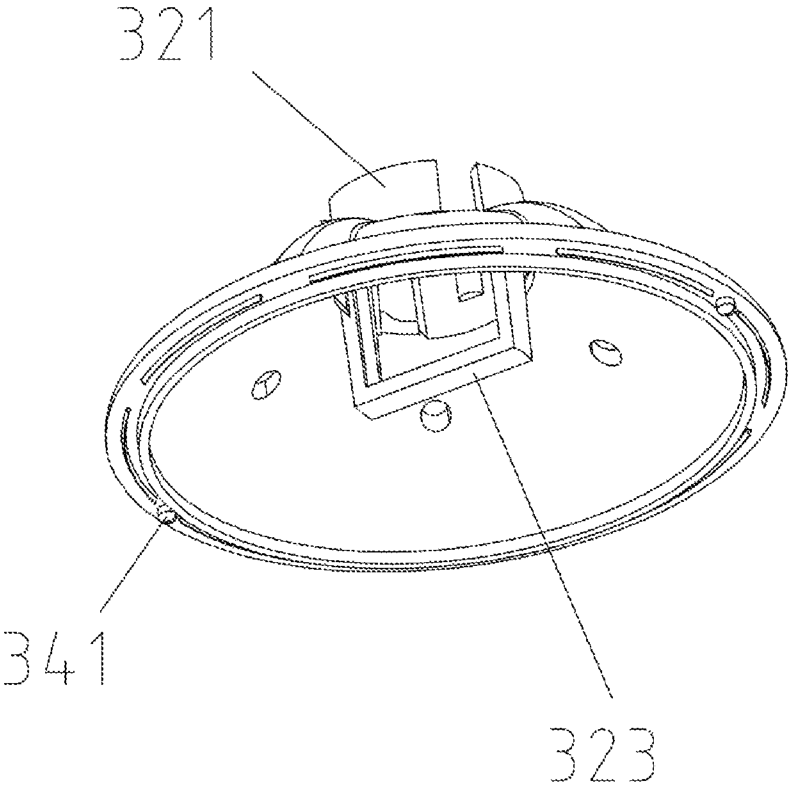
FIG. 3 is a schematic structural diagram of an end cover according to the present disclosure.

1: bubble tube; 11: low-boiling-point liquid; 12: catalyst layer; 2: heating bulb; 21: lamp holder; 22: bulb shell; 221: second insertion hole; 23: heating light source; 231: power board; 232: LED; 3: outer decorative lampshade; 31: bayonet; 311: notch; 32: first insertion hole; 321: elastic part; 322: rib; 323: isolation frame; 324: annular limiting part; 33: housing; 331: connecting recess; 34: end cover; 341: connecting protruding point; and 4: through hole.

Detailed Description of the Embodiments

The present disclosure will be explained below in conjunction with the accompanying drawings 1 to 5.

The present disclosure provides a bubble lamp for decoration, including a bubble tube 1 and a heating bulb 2 which are used cooperatively. In order to ensure the safety of the bubble tube 1, the bubble tube 1 is made of glass and is sealed. A small space is reserved at a top of the bubble tube 1. Low-boiling-point liquid 11 is injected into the bubble tube 1; the heating bulb 2 includes a lamp holder 21, a bulb shell 22, and a heating light source 23; the bulb shell 22 is fixedly connected to the lamp holder 21; and the heating light source 23 is electrically connected to the lamp holder 21. When the lamp holder 21 is connected to an external power supply to light up the heating light source 23, light of the heating light source 23 directly irradiates the bubble tube 1, and the light echoes with the liquid inside the bubble tube 1 to create a more beautiful lighting effect. Secondly, heat generated by the heating light source 23 through the electricity will also reach the low-boiling-point liquid 11 inside the bubble tube 1 through the bubble tube, so that the liquid is boiled to continuously generate bubbles inside the bubble tube 1. This transforms a static decorative lamp into a dynamic and vivid decorative lamp and adds fun to the lamp. Decorative objects such as glitters can also be added to the bubble tube 1, and the decorative objects can float up and down under the action of a bubble flow to improve the decoration effect of the lamp. In addition, to accelerate the generation of the bubbles, a fixed catalysis layer 12 is arranged at one end of the bubble tube 1 facing the heating light source 23.

As an embodiment, the low-boiling-point liquid 11 may use dichloromethane. The dichloromethane is a low-boiling-point organic compound with a boiling point of only 39.8° C., which meets the use requirements of this technical solution. Secondly, the dichloromethane has low toxicity, is inflammable at a room temperature, has high safety, and is suitable for industrial batch production.

In this technical solution, the catalyst layer 12 is a mixture of sodium silicate and glass splinters. The glass splinter is an irregular solid substance. Under the action of the sodium silicate, the glass splinters are fixed at an inner bottom of the bubble tube 1 and cause gaps of different sizes. When the dichloromethane at the bottom of the bubble tube 1 begins to be boiled when heated, the bubbles are separated through the irregular gaps to form more small bubbles, so that the bubble tube 1 can produce more and more obvious bubble flows.

Since it takes time that the heat generated by the heating bulb 2 makes the dichloromethane reach the boiling point, to shorten the reaction time, the bubble tube 1 is internally vacuumized, which can further reduce the boiling point of the dichloromethane, with a vacuum degree between −5 kPa and −10 kPa. This can achieve that the bubble tube 1 can quickly generate the bubbles once the bulb is lit up.

In this technical solution, the lamp further includes an outer decorative lampshade 3; a bottom end of the outer decorative lampshade 3 is provided with a bayonet 31; a top end of the outer decorative lampshade 3 is provided with a first insertion hole 32 configured to assemble the bubble tube 1; the heating bulb 2 is assembled inside the outer decorative lampshade 3; and the lamp holder 21 extends out of the bayonet 31 to facilitate electrical connection to an external device. The outer decorative lampshade 3 can be configured to assemble the heating bulb 2 and the bubble tube 1 and hide a joint between the bubble tube 1 and the heating bulb 2, which improves the aesthetic degree of the lamp.

Preferably, a circumferential side of the first insertion hole 32 extends towards an outer end to form several elastic parts 321; the several elastic parts 321 are spaced apart from one another and distributed in a surrounding manner to form an annular limiting part 324 to limit the bubble tube 1 and ensure the stable assembling of the bubble tube 1; and the elastic parts 321 are all provided with ribs 322. Due to the thermal expansion and cold contraction properties of the glass bubble tube 1, it is difficult to control the size during molding, and the bubble tube 1 may easily have a large size or a small size. In this case, the elastic parts 321 and the ribs 322 can be used to adapt to the size of the bubble tube 1, so as to enlarge the application range of the outer decorative lampshade 3.

As an embodiment, the bayonet 31 is provided with a notch 311. When the lamp holder 21 is welded to a conductive wire of the heating light source 23, a solder point with a large volume will appear and protrudes out of one side of the lamp holder 21. In this case, the notch 311 exactly accommodates the solder point.

Preferably, for convenience of assembling and disassembling of the outer decorative lampshade (3), the outer decorative lampshade 3 includes a housing 33 and an end cover 34 connected to the housing 33; the end cover 34 is provided with at least one group of connecting protruding points 341; and the housing 33 is provided with connecting recesses 331 corresponding to the connecting protruding points 341. The housing 33 and the end cover 34 are detachably connected through the connecting protruding points 341 with a simple structure and the connecting recesses 331 with a simple structure.

When the heating light source 23 is a tungsten filament, the heating bulb 2 is a tungsten filament bulb, and the bulb shell 22 is a glass bulb shell 22. The tungsten filament bulb has high heating efficiency and a higher heating temperature. The bubble tube 1 only needs to resist against a surface of the glass bulb shell 22 to make the dichloromethane boiled and generate bubbles.

When the tungsten filament bulb is used, as the bulb shell 22 and the bubble tube 1 are both made of a glass material, to prevent glass from colliding each other to be damaged during transportation or use, a bottom end of the first insertion hole 32 extends downwards and is provided with an isolation frame 323 to isolate the glass bulb shell 22 from the bubble tube 1. Furthermore, the isolation frame 323 is formed by a plastic material with a good heat conductivity coefficient, so that the isolation frame 323 will not affect the transferring of the heat. On the other hand, the isolation frame 323 has a positioning function. In a lamp forming process, a depth of the isolation frame 323 can be set in advance, so as to position an assembling depth of the bubble tube 1.

Figure 4:
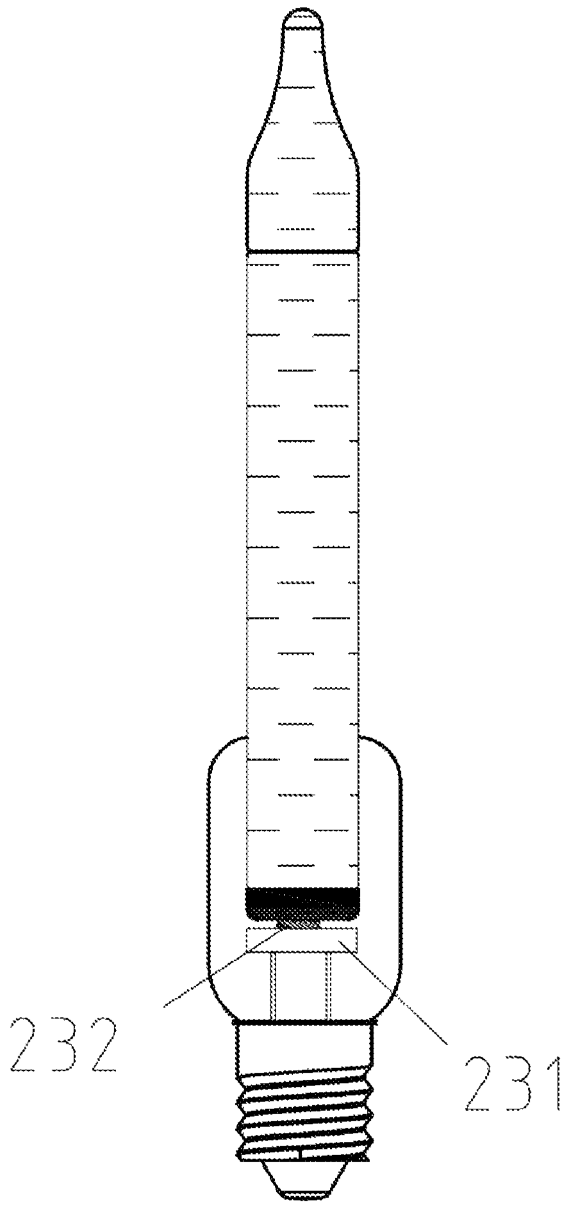
FIG. 4 is a schematic structural diagram of an embodiment of an LED lamp according to the present disclosure.
Figure 5:
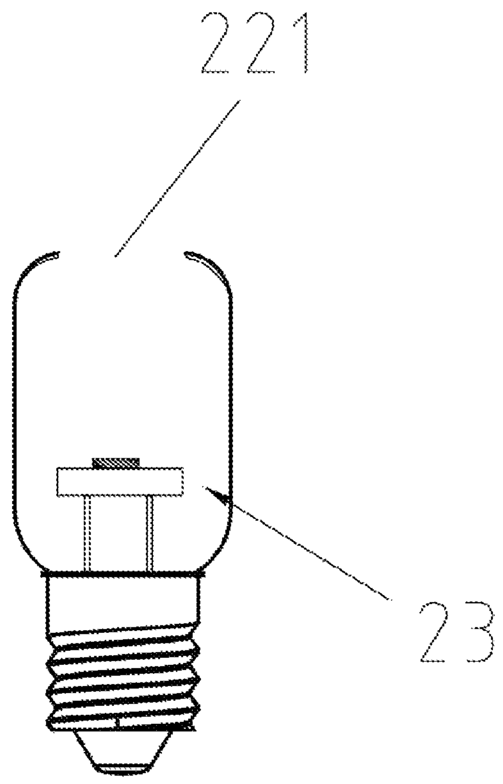
FIG. 5 is a schematic structural diagram of a second insertion hole according to the present disclosure.

As another embodiment, when the heating bulb 2 is an LED bulb, as shown in FIG. 4, the heating light source 23 includes a power board 231 and an LED 232 mounted on a surface of the power board 231. Due to the fact that the heating efficiency of the LED 232 is higher than that of the tungsten filament bulb, the bulb shell 22 can be formed by plastic. In this case, a second insertion hole 221 can be formed in a top end of the bulb shell 22. The bubble tube 1 is inserted into the second insertion hole 221 and resists against the LED 232 to limit the bubble tube 1 and cause the heat of the LED 232 to be quickly transferred to the bubble tube 1. In this embodiment, a circle of glue can be directly applied to a circumferential side of the second insertion hole 221 to connect and form the bubble tube 1 and the heating bulb 2. The outer decorative lampshade 3 can be added outside or the lamp can be directly used without the outer decorative lampshade 3, so that the use and manufacturing costs are lower.

As another embodiment, a surface of the outer decorative lampshade 3 is provided with several through holes 4 to embellish the outer decorative lampshade 3 and also to dissipate heat inside the lampshade.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A bubble lamp for decoration, comprising a bubble tube (1) and a heating bulb (2) which are used cooperatively, wherein the bubble tube (1) is a glass tube and is sealed; low-boiling-point liquid is further injected into the bubble tube (1); the heating bulb (2) comprises a lamp holder (21), a bulb shell (22), and a heating light source (23); the bulb shell (22) is fixedly connected to the lamp holder (21); the heating light source (23) is electrically connected to the lamp holder (21); the heating light source (23) is electrified to generate heat and promotes the low-boiling-point liquid (11) inside the bubble tube (1) to be boiled and generate bubbles; the bubble lamp for decoration further comprises a catalyst layer (12) configured to assist the low-boiling-point liquid (11) in generating the bubbles; and the catalyst layer (12) is fixedly arranged at one end of an inner side of the bubble tube (1) facing the heating light source (23); wherein the catalyst layer (12) is a mixture of sodium silicate and glass splinters.

2. The bubble lamp for decoration according to claim 1, wherein the low-boiling-point liquid (11) is dichloromethane.

3. The bubble lamp for decoration according to claim 1, further comprising an outer decorative lampshade (3), wherein a bottom end of the outer decorative lampshade (3) is provided with a bayonet (31); a top end of the outer decorative lampshade (3) is provided with a first insertion hole (32) configured to assemble the bubble tube (1); the heating bulb (2) is assembled inside the outer decorative lampshade (3); and the lamp holder (21) extends out of the bayonet (31).

4. The bubble lamp for decoration according to claim 3, wherein a circumferential side of the first insertion hole (32) extends towards an outer end to form several elastic parts (321); the several elastic parts (321) are spaced apart from one another and distributed in a surrounding manner to form an annular limiting part (324); and the elastic parts (321) are all provided with ribs (322).

5. The bubble lamp for decoration according to claim 3, wherein the bayonet (31) is provided with a notch (311).

6. The bubble lamp for decoration according to claim 3, wherein the outer decorative lampshade (3) comprises a housing (33) and an end cover (34) connected to the housing (33); the end cover (34) is provided with at least one group of connecting protruding points (341); and the housing (33) is provided with connecting recesses (331) corresponding to the connecting protruding points (341).

7. The bubble lamp for decoration according to claim 3, wherein the heating light source (23) is a tungsten filament, and the bulb shell (22) is a glass bulb shell (22).

8. The bubble lamp for decoration according to claim 7, wherein a bottom end of the first insertion hole (32) extends downwards and is provided with an isolation frame (323) for at least placing the bubble tube (1).

9. The bubble lamp for decoration according to claim 1, wherein the heating light source (23) comprises a power board (231) and a light-emitting diode (LED) (232) mounted on an upper surface of the power board (231); the bulb shell (22) is a plastic bulb shell (22); a second insertion hole (221) is arranged at a top end of the bulb shell (22); and the bubble tube (1) is inserted into the second insertion hole (221) and resists against the LED (232).

* * * * *